(12) United States Patent
Singla et al.

(10) Patent No.: US 9,438,616 B2
(45) Date of Patent: Sep. 6, 2016

(54) NETWORK ASSET INFORMATION MANAGEMENT

(75) Inventors: Anurag Singla, Sunnyvale, CA (US); Robert Block, Sunnyvale, CA (US); Dhiraj Sharan, Sunnyvale, CA (US); Dilraba Ibrahim, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/116,128

(22) PCT Filed: Oct. 31, 2011

(86) PCT No.: PCT/US2011/058673
§ 371 (c)(1),
(2), (4) Date: Nov. 6, 2013

(87) PCT Pub. No.: WO2012/166194
PCT Pub. Date: Dec. 6, 2012

(65) Prior Publication Data
US 2014/0075564 A1    Mar. 13, 2014

(51) Int. Cl.
*H04L 29/06*    (2006.01)
*H04L 12/24*    (2006.01)
*H04L 12/26*    (2006.01)

(52) U.S. Cl.
CPC ....... *H04L 63/1433* (2013.01); *H04L 63/0263* (2013.01); *H04L 63/20* (2013.01); *H04L 41/0893* (2013.01); *H04L 41/0896* (2013.01); *H04L 43/16* (2013.01)

(58) Field of Classification Search
CPC ........... H04L 63/1433; H04L 63/1416; H04L 63/20; H04L 41/0893; H04L 41/0896; H04L 43/16; H04L 63/0263; G06F 21/577; G06F 21/50

USPC .......................................................... 726/25
See application file for complete search history.

(56) References Cited

U.S. PATENT DOCUMENTS 7,096,502 B1 * 8/2006 Fox et al. ........................ 726/25
7,665,119 B2 * 2/2010 Bezilla .................. G06F 21/552
726/1

(Continued)

FOREIGN PATENT DOCUMENTS

CN    101151868 A    3/2008
CN    101174973 A    5/2008

(Continued)

OTHER PUBLICATIONS

Swiler, LP et al.; "Computer-Attack Graph Generation Tool", Darpa Information Survivability Conference & Exposition II, 2001, Disc Ex '01, Proceedings Jun. 12-14, 2001, Piscataway, New Jersey, USA pp. 307-321.*

(Continued)

*Primary Examiner* — Yonas Bayou
(74) *Attorney, Agent, or Firm* — Mannava & Kang, P.C.

(57) ABSTRACT

A network asset information management system (101) may include an asset determination and event prioritization module (105) to generate real-time asset information based on network activity involving an asset (102). A rules module (109) may include a set of rules for monitoring the network activity involving the asset. An information analysis module (110) may evaluate the real-time asset information and the rules to generate a notification (111) related to the asset. The rules may include rules for determining vulnerabilities and risks associated with the asset based on comparison of a level of traffic identified to or from an IP address related to the asset to a predetermined threshold. The notification may include a level of risk associated with the asset.

20 Claims, 4 Drawing Sheets

(56) References Cited

U.S. PATENT DOCUMENTS

| | | | | |
|---|---|---|---|---|
| 7,761,920 B2* | 7/2010 | Bezilla | G06F 21/552 | 726/1 |
| 7,840,663 B1* | 11/2010 | Hinchliffe | H04L 63/1408 | 709/224 |
| 8,171,555 B2* | 5/2012 | D'Mello | G06F 21/57 | 726/25 |
| 8,438,643 B2* | 5/2013 | Wiemer | G06F 21/577 | 380/250 |
| 8,479,297 B1* | 7/2013 | Edukulla | H04L 63/1433 | 713/188 |
| 8,561,197 B2* | 10/2013 | D'Mello | G06F 21/577 | 726/25 |
| 8,590,047 B2* | 11/2013 | Hoyt | G06F 11/00 | 726/25 |
| 8,677,496 B2* | 3/2014 | Wool | H04L 41/0873 | 713/193 |
| 8,782,796 B2* | 7/2014 | Hawthorn | H04L 63/0823 | 726/25 |
| 2004/0193907 A1* | 9/2004 | Patanella | 713/200 | |
| 2005/0160480 A1* | 7/2005 | Birt | G06F 11/008 | 726/25 |
| 2005/0193430 A1* | 9/2005 | Cohen | H04L 63/1433 | 726/25 |
| 2007/0067848 A1* | 3/2007 | Gustave | H04L 63/1433 | 726/25 |
| 2010/0312718 A1 | 12/2010 | Rosenthal et al. | | |

FOREIGN PATENT DOCUMENTS

| | | |
|---|---|---|
| CN | 101610174 A | 12/2009 |
| EP | 1768044 A2 | 3/2007 |
| EP | 2180656 A2 | 4/2010 |

OTHER PUBLICATIONS

Mummidi, Sailaja, et al.; "Information Management System Vulnerability Analysis Study", New Mexico Tech., Nov. 8, 2001, pp. 1-16.*

International Searching Authority, Appl. No. PCT/US20111/058673, filed Oct. 31, 2011, Search Report and Written Opinion dated Mar. 28, 2012.

Extended European Search Report, Dec. 22, 2014, European Patent Application No. 11866959.7, 5 pages.

* cited by examiner

NETWORK ASSET INFORMATION MANAGEMENT

CROSS-REFERENCE TO RELATED APPLICATION(S)

This application claims the benefit of provisional patent application U.S. Ser. No. 61/492,309, filed Jun. 1, 2011, which is expressly incorporated herein by reference.

BACKGROUND

For many large information technology (IT) organizations, the network assets (i.e. computers, laptops, routers, switches, web servers, database machines, and other components connected on the network) can grow to be so numerous, dispersed and managed by dispersed IT staff that it can become difficult to track and categorize these assets using traditional manual or automated approaches. In traditional systems, real time updates to the network infrastructure information using automated rules is not present.

There are various systems that maintain network asset and topology information. These systems usually use various network discovery techniques to discover the network nodes and topology at any given point of time. The discovery can be reissued to update the information regarding the network. These network assets may then be scanned using commercially available scanners or proprietary techniques to determine the vulnerabilities present on these assets. Scanners may also detect the open ports on a given asset that can be used to reach the asset and exploit its vulnerabilities.

For the foregoing approaches, asset information may not always be fully up-to-date. Further, the information usually corresponds to static attributes of the asset (e.g. business classification of asset, IP address, vulnerabilities etc.) but not to the dynamic attributes, such as current and historic bandwidth utilization, current set of attacks happening on the asset, current risk based on network traffic and static attributes of the asset etc., in real time.

Other systems also allow importation of static asset data collected by network scanners and periodic update of this data (usually in weeks or months, but possibly days at customer installations). Thus, the network asset information is not always up-to-date. Such systems also allow asset auto creation based on IP Address, Hostname and Media Access Control address (MAC address) of the machine, but not a rule based approach. Categories may also be added or removed from the assets through rules, but not any other aspect of the asset information (e.g., current patch level, vulnerabilities, risk etc. and any other user defined attributes.). The age of an asset may be maintained based upon last scan time, and using this information, asset model confidence may be calculated for activity occurring on the asset. For such systems, the asset model information confidence is based on the duration since last scan time. Since the last scan, the asset may have been patched for certain vulnerabilities, re-purposed for different business use, services may have been added or removed, and other changes may have been made.

BRIEF DESCRIPTION OF DRAWINGS

The embodiments are described in detail in the following description with reference to the following figures.

DETAILED DESCRIPTION OF EMBODIMENTS

Figure 1:
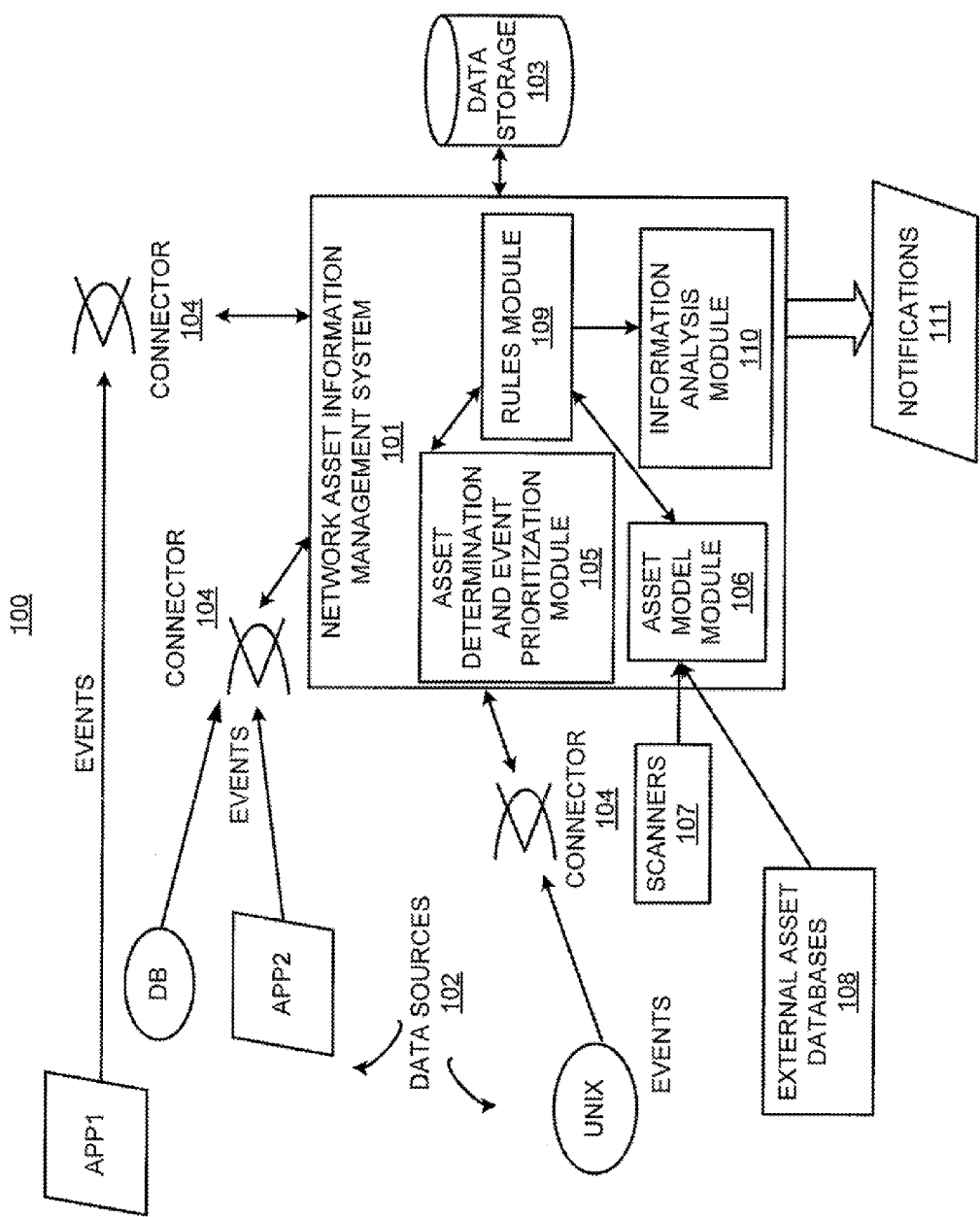
FIG. 1 illustrates an environment including a network asset information management system, according to an embodiment.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

1. Overview

A network asset information management system is described herein and provides for management of information about network assets automatically through rule based analysis of any event data. The data may be collected, for example, by connectors, and may include, for example, system logs, application logs, network data etc., in correlation with additional information observed about network assets internally by the system or provided externally to the system. These assets may include, for example, managed hosts, servers and network devices, which may be any machine (physical or virtual) having an IP address and connected to a customer's network. The servers may be shared or dedicated in a cloud offering that may appear and disappear in the network based on service demand.

The network asset information management system may provide for discovery and maintenance of rich information regarding assets. This information may be updated in real-time by analysis of the network activity involving these assets, provided to the network asset information management system through connectors collecting data from various network devices in a customer environment. Real-time data may be considered data that is evaluated and processed upon capture, as opposed to static data, which may be stored for processing at a subsequent time.

Furthermore, using rules that monitor network activity involving assets, richer set of data regarding assets may be calculated and maintained, including, for example, identifying list of services, applications, resource utilization, traffic assessment, vulnerabilities, attacks, viruses, worms, security compromise, rogue processes, rogue servers, operating system (OS) versions, patch levels, web clients, and risk associated with the asset. This rich information regarding assets may be further used by the network asset information management system in issuing security alerts related to asset compromises and attacks. The information may also facilitate providing a high level overview of the statistics and risks associated with a single asset or several assets grouped by any characteristic of the assets (e.g., services, business unit, network zone etc.).

The approach described herein of using event feeds of network and application activity occurring on the assets from the assets directly, as well as from other devices sending traffic to the assets, and further using a rule based approach to identify current activities on the assets provides richness of information, as well as updating of the statically or periodically calculated information with real-time analysis of the network activity.

The network asset information management system is described in further detail below and may include an asset determination and event prioritization module to generate real-time asset information based on network activity involving an asset. The modules and other components of the system may include machine readable instructions, hardware or a combination of machine readable instructions and hardware. The real-time asset information may include, for example, dynamic attributes such as current and historic bandwidth utilization, current set of attacks happening on the asset, and current risk based on network traffic etc. A rules module may include a set of rules for monitoring the network activity involving the asset. An information analysis module may evaluate the real-time asset information and the rules to generate a notification related to the asset. The notification may be in the form of a report. The rules may include rules for determining vulnerabilities and risks associated with the asset based on comparison of a level of traffic identified to or from an IP address related to the asset to a predetermined threshold. Vulnerability may be defined, for example, as a weakness based on exposure to attack, whereas risk may be defined, for example, as the possibility of an undesirable event occurring. The notification may include, for example, a level of risk associated with the asset.

For the network asset information management system described herein, the system may further include an asset model module to generate an asset model based on static information about the asset. The asset model may include static information about an asset. The static information may include, for example, business classification of asset, IP address etc. The information analysis module may thus evaluate the asset model, the real-time asset information, and the rules to generate the notification related to the asset. The static information about the asset may be obtained from a scanner and/or an external asset database. The network activity involving the asset may include, for example, event data involving the asset. The event data may include, for example, asset logs, application logs and/or network data. The event data may be received directly from the asset or from other devices interfacing with the asset (e.g., routers, other machines connected to the asset etc.). In addition, risk associated with an asset may be derived from risks, such as, for example, virus, malware etc., discovered on other assets in the same network zone as a particular asset. The network activity involving the asset may be obtained, for example, by a connector. The asset may include, for example, a managed host, a server or a network device. The rules for monitoring the network activity involving the asset may include rules for creation of an asset if traffic identified to or from an IP address related to the asset exceeds a predetermined threshold amount of data or duration, and the notification may include an indication for creation of the asset. The rules for monitoring the network activity involving the asset may also include rules for deletion of an asset if traffic has not been observed from the asset for a predetermined time-period, and the notification may include an indication for deletion of the asset. The rules for monitoring the network activity involving the asset may further include rules for updating of an asset if an event identifying an OS patch or application patch has been applied to the asset, and the notification may include an indication for updating of the asset. The rules for monitoring the network activity involving the asset include rules for determining vulnerabilities and risks associated with the asset. The information analysis module may maintain an age of an asset based on last scan time and use the age to calculate asset model information confidence for activity occurring on the asset. The information analysis module may use the asset model information confidence to calculate priority of the activity occurring on the asset. The notification related to the asset may include, for example, services, applications, resource utilization, traffic assessment, attacks, viruses, worms, security compromises, rogue processes, rogue servers, OS versions, patch levels, web clients, and/or risk associated with the asset. The notification related to the asset may be used to issue security alerts related to asset compromises and attacks. The notification related to the asset may also be used to generate statistics associated with the asset.

As described in further detail below, a method for network asset information management is provided and may include generating real-time asset information based on network activity involving an asset. The method may further include performing rule-based monitoring of the network activity involving the asset. The method may also include evaluating the real-time asset information and the monitored network activity to generate a notification related to the asset. Performing the rule-based monitoring of the network activity involving the asset may include determining vulnerabilities and risks associated with the asset based on comparison of a level of traffic identified to or from an IP address related to the asset to a predetermined threshold, and the notification may include a level of risk associated with the asset.

For the method described herein, the method may further include generating an asset model based on static information about the asset. The evaluation may further include evaluating the asset model, the real-time asset information, and the monitored network activity to generate the notification related to the asset. The method may include obtaining the network activity involving the asset by a connector. The method may also include maintaining an age of an asset based on last scan time and using the age to calculate asset model information confidence for activity occurring on the asset. The method may include using the asset model information confidence to calculate priority of the activity occurring on the asset.

As also described in further detail below, a non-transitory computer readable medium storing machine readable instructions is provided. The machine readable instructions when executed by a computer system may perform a method for network asset information management including generating real-time asset information based on network activity involving an asset. The method may further include performing rule-based monitoring of the network activity involving the asset. The method may also include evaluating the real-time asset information and the monitored network activity to generate a notification related to the asset. Performing the rule-based monitoring of the network activity involving the asset may include determining vulnerabilities and risks associated with the asset based on comparison of a level of traffic identified to or from an IP address related to the asset to a predetermined threshold, and the notification may include a level of risk associated with the asset.

2. System

FIG. 1 illustrates an environment 100 for the network asset information management system 101, according to an embodiment. The environment 100 may include data sources 102 (i.e., assets) generating event data for events, which may be collected by the network asset information management system 101 and stored in the data storage 103. Connectors 104 may include code comprised of machine readable instructions that provide event data from the data sources 102 to the network asset information management system 101. The connectors 104 may provide efficient, real-time local event data capture and filtering from the data sources 102. An asset determination and event prioritization module 105 may determine assets based on the event data captured by the connectors 104, and provide for prioritization of events as described below. The asset determination and event prioritization module 105 may also generate real-time information about the data sources 102 based on network activity involving the data sources. An asset model module 106 may obtain static asset information from scanners 107 and/or external asset databases 108, and generate an asset model based on the static information about the data sources 102. A rules module 109 may obtain information from the asset determination and event prioritization module 105 and/or the asset model module 106, and may include a set of rules for monitoring network activity involving the data sources 102. An information analysis module 110 may evaluate the asset model, the real-time asset information, and the rules to generate, for example, notifications at 111. Thus the module 110 may perform event processing based on the information provided by the asset determination and event prioritization module 105, the asset model module 106, and the rules module 109.

As discussed herein, for the network asset information management system 101, an event may be any activity that can be monitored and analyzed. Data captured for an event may be referred to as event data. The analysis of captured event data may be performed to determine if the event is associated with a threat or some other condition. Examples of activities associated with events may include logins, logouts, sending data over a network, sending emails, accessing applications, reading or writing data, performing transactions, etc. An example of a common threat may include a network security threat whereby a user is attempting to gain unauthorized access to confidential information, such as social security numbers, credit card numbers, etc., over a network.

The data sources 102 may include network devices, applications or other types of data sources described below operable to provide event data that may be analyzed. Event data may be captured in logs or messages generated by the data sources 102. For example, intrusion detection systems (IDSs), intrusion prevention systems (IPSs), vulnerability assessment tools, firewalls, anti-virus tools, anti-spam tools, encryption tools, and business applications may generate logs describing activities performed by the source. Event data may be provided, for example, by entries in a log file or a syslog server, alerts, alarms, network packets, emails, or notification pages.

Event data may include information about the device or application that generated the event and when the event was received from the event source ("receipt time"). The receipt time may be a date/time stamp, and the event source may be a network endpoint identifier (e.g., an IP address or Media Access Control (MAC) address) and/or a description of the source, possibly including information about the product's vendor and version. The data/time stamp, source information and other information may be used to correlate events with a user and analyze events for threats.

Examples of the data sources 102 are shown in FIG. 1 as Database (DB), UNIX, App1 and App2. DB and UNIX are systems that include network devices, such as servers, and may generate event data. App1 and App2 are applications that are hosted for example by the DB systems respectively, and also generate event data. App1 and App2 may be business applications, such as financial applications for credit card and stock transactions, IT applications, human resource applications, or any other type of applications.

Other examples of data sources 102 may include security detection and proxy systems, access and policy controls, core service logs and log consolidators, network hardware, encryption devices, and physical security. Examples of security detection and proxy systems include IDSs, IPSs, multipurpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices includes routers and switches. Examples of encryption devices include data security and integrity. Examples of physical security systems include card-key readers, biometrics, burglar alarms, and fire alarms.

The data storage 103 may include a database or other type of data storage system. The data storage 103 may include memory for performing in-memory processing and/or non-volatile storage for database storage and operations. The data storage 103 may store any data used by the network asset information management system 101 to correlate and analyze event data.

The connectors 104 may include code comprised of machine readable instructions that provide event data from the data sources 102 to the network asset information management system 101. Alternatively, the event data may be collected from other devices directly or indirectly connected to the data sources 102. The connectors 104 may provide efficient, real-time for near real-time) local event data capture and filtering from the data sources 102. The connectors 104, for example, collect event data from event logs or messages. The collection of event data by the connectors 104 is shown as "EVENTS" describing some data sent from the data sources 102 to the connectors 104 in FIG. 1. The connectors 104 may reside at the data sources 102 or at intermediate points between the data sources 102 and the network asset information management system 101. For example, the connectors 104 may reside at network devices, at consolidation points within the network, and/or operate through simple network management protocol (SNMP) traps. The connectors 104 may send the event data to the network asset information management system 101. The connectors 104 may be configurable through both manual and automated processes and via associated configuration files. Each connector may include one or more software modules including a normalizing component, a time correction component, an aggregation component, a batching component, a resolver component, a transport component, and/or additional components. These components may be activated and/or deactivated through appropriate commands in the configuration file.

The asset determination and event prioritization module 105 may collect and analyze the event data in conjunction with the information analysis module 110. Events may be cross-correlated with rules by the rules module 109 to create meta-events. Correlation includes, for example, discovering the relationships between events, inferring the significance of those relationships (e.g., by generating metaevents), prioritizing the events and meta-events, and providing a framework for taking action. The network asset information management system 101 (one embodiment of which is manifest as machine readable instructions executed by computer hardware such as a processor) provided for aggregation, correlation, detection, and investigative tracking of activities. The system 101 also supports response management, ad-hoc query resolution, reporting and replay for forensic analysis, and graphical visualization of network threats and activity.

The asset determination and event prioritization module 105 may thus determine which data sources 102 (i.e., assets) are enrolled. For example, a router may indicate that an event is arriving from IP address 192.168.10.1 and going to IP address 192.168.2.1 and port 60. Based on this information, the module 105 may determine which data source 102 has the particular 192.168.10.1 IP address in a particular network from which the information is being obtained. Based on this type of information, the information analysis module 110 may determine the vulnerability involved based in conjunction with the information provided by the asset model module 106 and the rules module 109.

Referring to FIG. 1, the network asset information management system 101 provides real-time management of the information about network assets through rule based analysis of network traffic. The system 101 also provides for enhancement of the set of asset information maintained based on automatic rule-based analysis and maintenance of data. Such additional information may include, for example, traffic utilization, patch level for OS and applications, risk associated with the asset, compromised vulnerabilities etc., and any user defined attribute. These attributes may be maintained in real-time using rule based analysis of traffic in correlation with already available or deduced information about these assets. Thus traffic related data may be analyzed to discover an asset, and/or to determine additional information about assets. For example, assuming an asset is accepting traffic at a port, based on the traffic, the network asset information management system 101 may determine, for example, the type of service being provided by the asset. For example, the system 101 may determine the type of software being executed by the asset. The type of traffic from an asset may also be used to determine a particular type of service being provided by the asset. For example, an activity log from the asset may be used to determine what type of patches have been applied and the vulnerability of the asset in real-time. This information may be used to determine the vulnerability of the asset for other types of traffic in real-time.

The foregoing and other aspects of the network asset information management system 101 described herein may be implemented with or without information related to static attributes of assets. Thus, without information related to static attributes of assets provided by the scanners 107 and the external asset databases 108, the network asset information management system may utilize real-time traffic related information provided by the connectors 104 to determine information about assets.

A new timestamp may be added to the asset attributes to track the last time the rules updated the asset information. This may be used in conjunction with the last asset scan time to calculate the asset model information confidence, which may be used to calculate priority of events or activity involving these assets. Other attributes may be added to assets, including, for example, timestamps that can be updated by rules. The timestamp may facilitate an understanding of an activity level of an asset. For example, if an asset has no activity for a time period, a timestamp may facilitate an understanding of when the activity stopped. Such timestamp information may also be used to determine the existence of an asset. The timestamp may also be used in conjunction with rules to assign a model confidence to the notifications 111 generated by the system 101.

Using the asset determination and event prioritization module 105, asset model information may be utilized by a prioritization component for prioritizing events based on, among other attributes, the identified vulnerabilities and open ports of the asset. The prioritization may be analyzed by the information analysis module 110. In the absence of a rule based approach, the confidence regarding truthfulness of this information may be influenced by the last scan time. However, with the rules provided by the rules module 109 being able to monitor the patch installations, vulnerability compromises, traffic to various ports, and other events targeted at an asset, certain components of the asset information may be updated in real-time by rules. Thus, knowledge of the last time rules refreshed the asset information may facilitate calculation of the asset information model confidence to be utilized by event prioritization.

With regard to event prioritization, as discussed above, timestamp information may be used to raise or lower priority of risk of a particular asset activity. For example, for traffic from one source going to a specific port of an asset, the traffic may contain a packet that points to exploitation of a certain vulnerability. The information from the packet may be compared to previously obtained information at a particular timestamp to determine the level of vulnerability.

The asset model module 106 may obtain static asset information from the scanners 107 and/or the external asset databases 108. Information collected from the scanners 107 and/or the external asset databases 108 may form the basis of an asset model used by the rules module 109. Thus for any asset under analysis, even prior to collection of any real-time information from the connectors 104, the asset model module 106 may determine an asset model based on the initial information collected from the scanners 107 and/or the external asset databases 108. Based partially on the asset model determined by the asset model module 106, the information analysis module 110 may determine the type of services being performed by an asset or whether the assessed is vulnerable to attack.

The rules module 109 may include, for example, rule conditions for asset creation, deletion and update. The rule conditions may be applicable to any of a number of the data sources 102 (i.e., assets) managed by the network asset information management system 101. Asset creation may be based on the rule condition that traffic identified to or from an IP address exceeds more than a threshold amount of data or duration. Asset deletion may be based on the rule condition that traffic has not been seen from an asset for a period of time, which may be user defined. Asset update may be based on the rule condition that an event identifying an OS patch or application patch applied to the asset. Additional components may maintain mappings between OS patch and vulnerabilities addressed. The rule module 109 may update the asset vulnerability list. For asset update, another rule condition may include the event identifying connection accepted to a port on an asset which was not known to be open. Asset open ports may be updated. For asset update, another rule condition may include an asset compromise is identified by a rule based on complex rule conditions. The rules may thus raise asset risk.

Asset information may be deduced from various events directly or indirectly, and the confidence level of the asset information may be affected as follows. Events retrieved may directly report device vendor and device product information (e.g., name, patch level, version level etc.). This provides a high level of confidence that the asset/system information is accurate. For example, since the event is describing parts of an asset and the information is arriving directly from the asset, the events retrieved may thus provide a high level of confidence that the asset/system information is accurate. Events may also contain information about the connections made from an asset/device to another asset. This gives a second degree of confidence regarding the services running on an asset/system. Events may also report the user agents used for web browsing, the OS versions, patch levels and even the applications installed on a system. Based on this information, richer data about assets, such as list of applications, web browser clients and operation system versions may be deduced.

The network asset information management system 101 also provides for enrichment of asset information (e.g. current and historic bandwidth utilization, current set of attacks going on the asset, current risk based on network traffic, risk associated with other assets in the network zone, and static attributes of the asset etc.). For example, the network information may be enriched with security information from an asset to thus update the risk associated with an asset in real-time. The risk may be compared to predetermined risk thresholds to determine actual risk, for example, for a particular network, department or organization. Based on the security information for an asset, the system 101 may determine that a particular risk or attack actually compromises an asset, thus raising the level of risk. For example, if traffic identified to or from an IP address related to an asset exceeds a predetermined threshold amount of data or duration, such an increase in traffic may render an asset vulnerable to attack and therefore a level of risk related to an asset may be raised. The system 101 may also maintain a list of all vulnerabilities that have been exploited for a predetermined time period for a particular asset or vulnerabilities that have been tried out but were not exploited. Such security information may be added to the asset model in real-time. With regard to enrichment of asset information as discussed herein, the rules module 109 may also include rules that identify which vulnerabilities may be exploited or not exploited.

Figure 2:
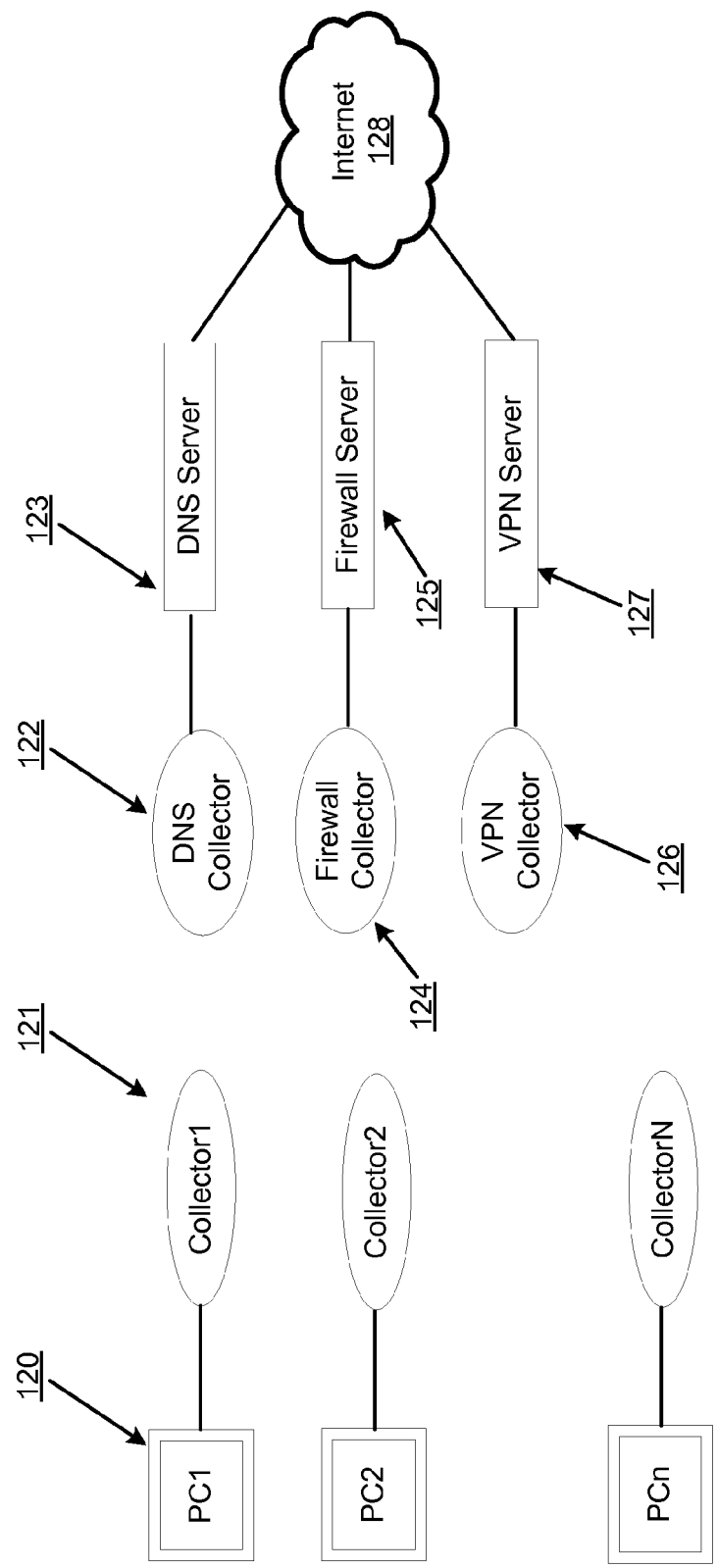
FIG. 2 illustrates a system interaction diagram for the network asset information management system, according to an embodiment.

FIG. 2 illustrates a system interaction diagram for the network asset information management system 101, according to an embodiment. For example, FIG. 2 shows various network switches 120 (i.e., PC1, PC2 . . . PCn), and collectors 121, which may function similar to connectors 104 of FIG. 1. Additional components may include a domain name system (DNS) collector 122 for obtaining information from DNS server 123, firewall collector 124 for obtaining information from firewall server 125, and a virtual private network (VPN) collector 126 for obtaining information from VPN server 127. The DNS server 123, firewall server 125 and VPN server 127 may be connected to the Internet 128 for providing information to the network asset information management system 101.

For the network asset information management system 101, management of the information about network assets automatically through rule based analysis of network traffic, in correlation with additional information observed about network assets internally by the system or provided externally to the system, thus provides real-time and accurate maintenance of information. The system also provides for enrichment of asset information (e.g. current and historic bandwidth utilization, current set of attacks going on the asset, current risk based on network traffic and static attributes of the asset etc.). Further, the system provides the ability to maintain the last update timestamp of asset information through rules which can be further used to identify possible staleness of information. This can be further used, for example, by the information analysis module 110 to calculate asset model confidence. The system also provides a flexible framework (using flexible user customizable rules) to manage and use the asset information.

3. Method

Figure 3:
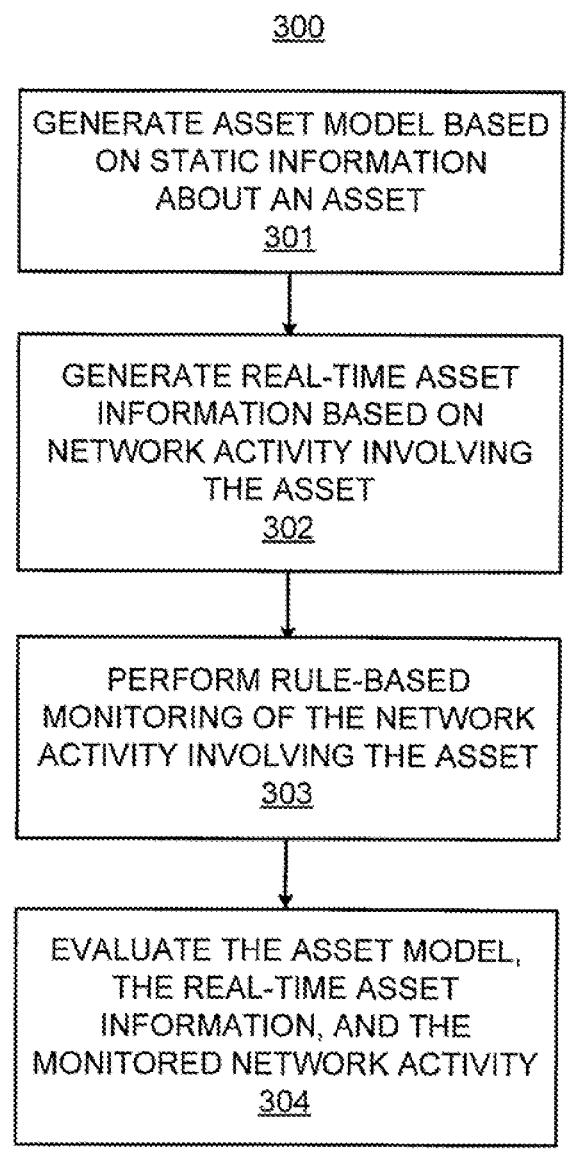
FIG. 3 illustrates a method for network asset information management, according to an embodiment.

FIG. 3 illustrates a method 300 for network asset information management, according to an embodiment. The method 300 may be implemented on the network asset information management system 101 described above with reference to FIGS. 1 and 2 by way of example and not limitation. The method 300 may be practiced in other systems.

For the method 300, referring to FIGS. 1-3, at block 301, the method may include generating an asset model based on static information about an asset. As shown in FIG. 1, the asset model module 106 may generate the asset model based on static information about the data sources 102 i.e., (assets). The static information about the assets may be obtained from the scanners 107 and/or the external asset databases 108. The assets may include, for example, a managed host, a server or a network device.

At block 302, the method may include generating real-time asset information based on network activity involving the asset. As shown in FIG. 1, the asset determination and event prioritization module 105 may generate the real-time asset information based on network activity involving the asset. The network activity involving the asset may include, for example, event data involving the asset. The event data may include, for example, asset logs, application logs and/or network data. The network activity involving the asset may be obtained, for example, by the connectors 104.

At block 303, the method may include performing rule-based monitoring of the network activity involving the asset. As shown in FIG. 1, the rules module 109 may include a set of rules for monitoring the network activity involving the asset. Performing the rule-based monitoring of the network activity involving the asset may include determining vulnerabilities and risks associated with the asset based on comparison of a level of traffic identified to or from an IP address related to the asset to a predetermined threshold. In this regard, the notification at block 304 below may include a level of risk associated with the asset. The rules for monitoring the network activity involving the asset may include rules for creation of an asset if traffic identified to or from an IP address related to the asset exceeds a predetermined threshold amount of data or duration. The rules may also include rules for deletion of an asset if traffic has not been observed from an asset for a predetermined time-period. The rules may further include rules for updating of an asset if an event identifying an OS patch or application patch has been applied to the asset.

At block 304, the method may include evaluating the asset model, the real-time asset information, and the monitored network activity to generate a notification related to the asset. As shown in FIG. 1, the information analysis module 110 may evaluate the asset model, the real-time asset information, and the rules to generate the notifications 111 related to the asset. The information analysis module 110 may maintain an age of an asset based on last scan time and use the age to calculate asset model information confidence for activity occurring on the asset. The information analysis module 110 may use the asset model information confidence to calculate priority of the activity occurring on the asset. The notifications 111 related to the asset may include, for example, services, applications, resource utilization, traffic assessment, attacks, viruses, worms, security compromises, rogue processes, rogue servers, OS versions, patch levels, web clients, and/or risk associated with the asset. The notifications 111 may be used to issue security alerts related to asset compromises and attacks. The notifications 111 may also be used to generate statistics and risks associated with the asset.

4. Computer Readable Medium

Figure 4:
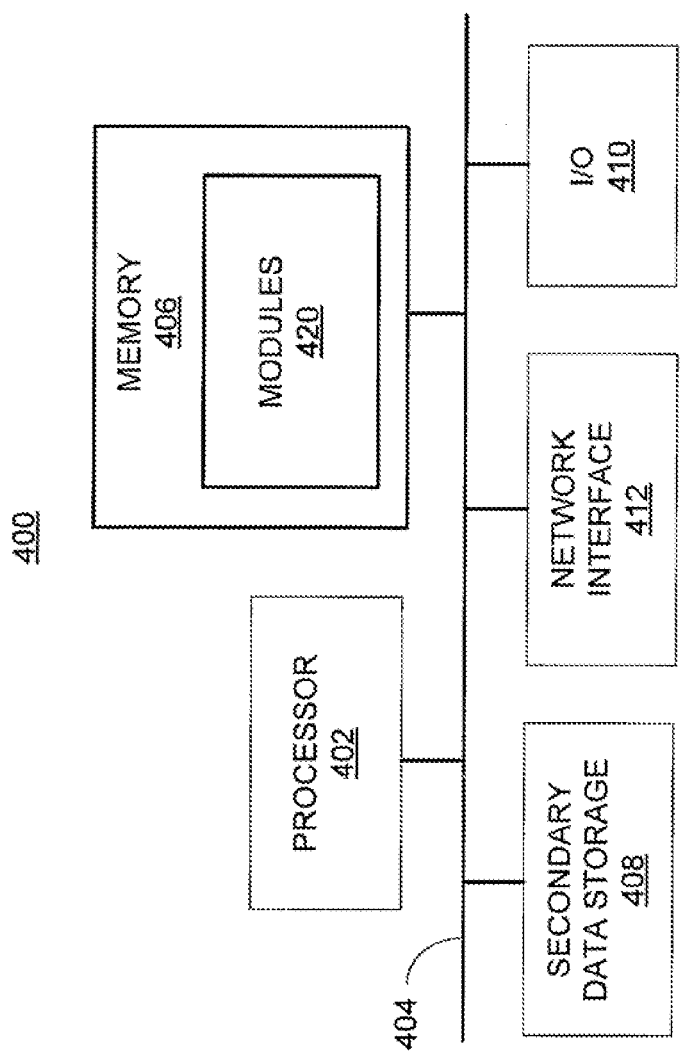
FIG. 4 illustrates a computer system that may be used for the system and related method, according to an embodiment.

FIG. 4 shows a computer system 400 that may be used with the embodiments described herein. The computer system 400 represents a generic platform that includes components that may be in a server or another computer system. The computer system 400 may be used as a platform for the system 101. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 105, 106, 109 and 110 of the system 101 shown in FIG. 1.

The computer system 400 may include an I/O device 410, such as a keyboard, a mouse, a display, touchscreen, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A network asset information management system comprising a hardware processor of a computer, the hardware processor that:
   generates real-time asset information based on network activity involving an asset;
   performs rule-based monitoring of the network activity involving the asset based on rules;
   maintains an age of the asset based on last scan time and uses the age to calculate a) asset model information confidence for activity occurring on the asset, and b) priority of the activity occurring on the asset; and
   evaluates the real-time asset information and the rules to generate a notification related to the asset,
   wherein the rules for monitoring the network activity involving the asset include at least one rule for determining a level of risk associated with the asset based on comparison of a level of traffic identified to or from an IP address related to the asset to a predetermined threshold, and wherein the notification includes the level of risk associated with the asset.

2. The network asset information management system of claim 1, the hardware processor that:
   generates an asset model based on static information about the asset; and
   evaluates the asset model, the real-time asset information, and the rules to generate the notification related to the asset.

3. The network asset information management system of claim 2, wherein the static information about the asset is obtained from a scanner.

4. The network asset information management system of claim 2, wherein the static information about the asset is obtained from an external asset database.

5. The network asset information management system of claim 1, wherein the network activity involving the asset includes event data involving the asset, and wherein the event data includes asset logs, application logs, or network data.

6. The network asset information management system of claim 1, wherein the network activity involving the asset is obtained by a connector.

7. The network asset information management system of claim 1, wherein the rules for monitoring the network activity involving the asset include at least one rule for creation of an asset if the traffic identified to or from an IP address related to the asset exceeds a predetermined threshold amount of data or duration, and wherein the notification includes an indication for the creation of the asset.

8. The network asset information management system of claim 1, wherein the rules for monitoring the network activity involving the asset include at least one rule for deletion of an asset if the traffic has not been observed from the asset for a predetermined time-period, and wherein the notification includes an indication for the deletion of the asset.

9. The network asset information management system of claim 1, wherein the rules for monitoring the network activity involving the asset include at least one rule for updating of an asset if an event identifying an OS patch or application patch has been applied to the asset, and wherein the notification includes an indication for the updating of the asset.

10. The network asset information management system of claim 1, wherein the notification related to the asset includes services, applications, resource utilization, traffic assessment, attacks, viruses, worms, security compromises, rogue processes, rogue servers, operating system (OS) versions, patch levels, or web clients associated with the asset.

11. The network asset information management system of claim 1, wherein the notification related to the asset is used to generate statistics associated with the asset.

12. A method for network asset information management, the method comprising:
   generating real-time asset information based on network activity involving an asset;
   performing rule-based monitoring of the network activity involving the asset;
   maintaining, by a hardware processor, an age of the asset based on last scan time;
   calculating, by the hardware processor, a) asset model information confidence for activity occurring on the asset, and b) priority of the activity occurring on the asset;

evaluating, by the hardware processor, the real-time asset information and the monitored network activity; and generating a notification related to the asset based on the evaluation, wherein performing the rule-based monitoring of the network activity involving the asset includes determining a level of risk associated with the asset based on comparison of a level of traffic identified to or from an IP address related to the asset to a predetermined threshold, and wherein the notification includes the level of risk associated with the asset.

13. The method of claim 12, comprising:

generating an asset model based on static information about the asset;

evaluating the asset model, the real-time asset information, and the monitored network activity; and generating the notification related to the asset based on the evaluation.

14. The method of claim 12, wherein the network activity involving the asset includes event data involving the asset, and wherein the event data includes asset logs, application logs, or network data.

15. The method of claim 12, wherein the notification related to the asset includes services, applications, resource utilization, traffic assessment, attacks, viruses, worms, security compromises, rogue processes, rogue servers, operating system (OS) versions, patch levels, or web clients associated with the asset.

16. The method of claim 12, the method comprising:

performing the rule-based monitoring of the network activity involving the asset based on rules, wherein the rules for monitoring the network activity involving the asset include at least one rule for creation of an asset if the traffic identified to or from an IP address related to the asset exceeds a predetermined threshold amount of data or duration, and wherein the notification includes an indication for the creation of the asset.

17. A non-transitory computer readable medium storing machine readable instructions, that when executed by a computer system, perform a method for network asset information management, the method comprising:

obtaining real-time asset information based on network activity involving an asset using a connector;

performing rule-based monitoring of the network activity involving the asset;

maintaining, by a hardware processor, an age of the asset based on last scan time;

calculating, by the hardware processor, a) asset model information confidence for activity occurring on the asset, and b) priority of the activity occurring on the asset; and evaluating, by the hardware processor, the real-time asset information and the monitored network activity to generate a notification related to the asset, wherein performing the rule-based monitoring of the network activity involving the asset includes determining a level of risk associated with the asset based on comparison of a level of traffic identified to or from an IP address related to the asset to a predetermined threshold, and wherein the notification includes the level of risk associated with the asset.

18. The non-transitory computer readable medium of claim 17, wherein the network activity involving the asset includes event data involving the asset, and wherein the event data includes asset logs, application logs, or network data.

19. The non-transitory computer readable medium of claim 17, wherein the notification related to the asset includes services, applications, resource utilization, traffic assessment, attacks, viruses, worms, security compromises, rogue processes, rogue servers, operating system (OS) versions, patch levels, or web clients associated with the asset.

20. The non-transitory computer readable medium of claim 17, the method comprising:

performing the rule-based monitoring of the network activity involving the asset based on rules, wherein the rules for monitoring the network activity involving the asset include at least one rule for creation of an asset if the traffic identified to or from an IP address related to the asset exceeds a predetermined threshold amount of data or duration, and wherein the notification includes an indication for the creation of the asset.

* * * * *